United States Patent
Wagner (10) Patent No.: US 9,657,722 B2
(45) Date of Patent: May 23, 2017

(54) METHOD AND SLIDING FORM FOR PRODUCING A STRUCTURE AND CORRESPONDING STRUCTURE

(75) Inventor: Philipp Wagner, Mellrichstadt (DE)

(73) Assignee: X-Tower Consructions GmbH, Munich (DE)

(*) Notice: Subject to any disclaimer, the term of this patent is extended or adjusted under 35 U.S.C. 154(b) by 0 days.

(21) Appl. No.: 14/232,623

(22) PCT Filed: Jul. 17, 2012

(86) PCT No.: PCT/EP2012/003007
§ 371 (c)(1),
(2), (4) Date: Jan. 14, 2014

(87) PCT Pub. No.: WO2013/010664
PCT Pub. Date: Jan. 24, 2013

(65) Prior Publication Data
US 2014/0157715 A1  Jun. 12, 2014

(30) Foreign Application Priority Data
Jul. 17, 2011  (DE) .................. 10 2011 107 804

(51) Int. Cl.
*E04H 12/34* (2006.01)
*F03D 11/04* (2006.01)
(Continued)

(52) U.S. Cl.
CPC ............ *F03D 11/045* (2013.01); *E04G 11/20* (2013.01); *E04H 12/12* (2013.01); *E04H 12/16* (2013.01);
(Continued)

(58) Field of Classification Search
CPC ....... E04H 12/12; E04H 12/16; E04H 12/341; E04C 3/20; E04C 3/29; E04C 3/34;
(Continued)

(56) References Cited

U.S. PATENT DOCUMENTS 1,490,217 A * 4/1924 Kircher .................. E01F 5/005
138/175
2,425,079 A * 8/1947 Billig ........................ B63B 3/62
114/65 A
(Continued)

FOREIGN PATENT DOCUMENTS

FR  2 119 228  8/1972
WO  WO 9809042 A1 *  3/1998  ............... E04C 5/07

OTHER PUBLICATIONS

Translation of WO 9809042A1.*
(Continued)

*Primary Examiner* — James Ference
(74) *Attorney, Agent, or Firm* — Carlson, Gaskey & Olds, PC (57) ABSTRACT

A load-bearing structure and a method of producing a load-bearing structure, in particular a tower of a wind energy plant, provides a hollow concrete part with an outer wall which is manufactured by several layers produced in wet-on-wet technology. The outer layer is a fine-grain concrete layer provided with a textile reinforcement, and the inner layer is made of bulk concrete.

22 Claims, 8 Drawing Sheets (51) Int. Cl.
*E04H 12/12* (2006.01)
*E04H 12/16* (2006.01)
*E04G 11/20* (2006.01)
*F03D 13/20* (2016.01)

(52) U.S. Cl.
CPC ........... *E04H 12/341* (2013.01); *F03D 13/22* (2016.05); *F05B 2230/00* (2013.01); *F05B 2240/912* (2013.01); *Y02E 10/728* (2013.01); *Y10T 29/49631* (2015.01)

(58) Field of Classification Search
CPC ...... E04G 11/20; F03D 13/22; F05B 2230/00; F05B 2240/912; Y02E 10/728; Y10T 29/49631
USPC .............. 52/651.07, 651.01, 651.02, 651.04, 52/651.08, 651.11, 660, 661, 662, 664, 52/676, 745.04, 745.03; 425/63, 64, 65
See application file for complete search history.

(56) References Cited

U.S. PATENT DOCUMENTS

| | | | | |
|---|---|---|---|---|
| 3,429,758 A * | 2/1969 | Young | | 156/79 |
| 3,520,749 A * | 7/1970 | Rubenstein | | 156/173 |
| 3,581,780 A * | 6/1971 | Ono | | C04B 22/00 138/175 |
| 3,652,755 A * | 3/1972 | Iorns et al. | | 264/219 |
| 3,664,287 A * | 5/1972 | Duff | | B63B 5/14 114/65 A |
| 3,742,985 A * | 7/1973 | Rubenstein | | 138/141 |
| 3,928,104 A * | 12/1975 | Luckett et al. | | 156/171 |
| 3,949,144 A * | 4/1976 | Duff | | E04C 2/26 428/413 |
| 4,031,708 A * | 6/1977 | Hanson | | 405/133 |
| 4,049,022 A * | 9/1977 | Farahar | | 138/176 |
| 4,193,750 A * | 3/1980 | Nielson | | E04G 11/20 425/261 |
| 4,217,080 A * | 8/1980 | Sandowicz | | B28B 21/90 264/69 |
| 4,283,446 A * | 8/1981 | McLain | | 428/36.3 |
| 4,314,798 A * | 2/1982 | Pettersson | | 425/63 |
| 4,320,075 A * | 3/1982 | Nielson | | E04G 11/34 264/228 |
| 4,514,245 A * | 4/1985 | Chabrier | | 156/161 |
| 4,786,341 A * | 11/1988 | Kobatake et al. | | 156/71 |
| 4,883,416 A * | 11/1989 | Tomminen | | 425/64 |
| 5,024,557 A * | 6/1991 | Iorns | | 405/223 |
| 5,043,033 A * | 8/1991 | Fyfe | | 156/71 |
| 5,133,510 A * | 7/1992 | Davis et al. | | 242/438.1 |
| 5,194,110 A * | 3/1993 | Fawley | | 156/94 |
| 5,218,810 A * | 6/1993 | Isley, Jr. | | 52/834 |
| 5,440,845 A * | 8/1995 | Tadros et al. | | 52/309.12 |
| 5,555,696 A * | 9/1996 | Morrison et al. | | 52/309.1 |
| 5,599,599 A * | 2/1997 | Mirmiran et al. | | 428/36.3 |
| 5,633,057 A * | 5/1997 | Fawley | | 428/36.1 |
| 5,649,398 A * | 7/1997 | Isley et al. | | 52/309.17 |
| 5,946,880 A * | 9/1999 | Morrison et al. | | 52/309.1 |
| 6,048,426 A * | 4/2000 | Pratt | | 156/177 |
| 6,123,485 A * | 9/2000 | Mirmiran et al. | | 405/252 |
| 6,189,286 B1 * | 2/2001 | Seible et al. | | 52/834 |
| 7,906,191 B2 * | 3/2011 | Pratt | | 428/36.9 |
| 7,963,747 B2 * | 6/2011 | Cairo | | 416/230 |
| 2003/0189265 A1 * | 10/2003 | Sandqvist | | B28B 1/008 264/33 |
| 2005/0138877 A1 * | 6/2005 | Inoue et al. | | 52/414 |
| 2005/0284032 A1 * | 12/2005 | Igarashi | | 52/58 |
| 2006/0070338 A1 * | 4/2006 | Pantelides et al. | | 52/721.3 |
| 2007/0071550 A1 * | 3/2007 | Shaw et al. | | 404/75 |
| 2007/0193674 A1 * | 8/2007 | Hourahane | | 156/73.5 |
| 2007/0234652 A1 * | 10/2007 | Shaw et al. | | 52/181 |
| 2008/0184654 A1 * | 8/2008 | Polyzois et al. | | 52/651.01 |
| 2008/0313972 A1 * | 12/2008 | Grob et al. | | 52/40 |
| 2009/0000227 A1 * | 1/2009 | Jakubowski et al. | | 52/223.4 |
| 2009/0025304 A1 * | 1/2009 | Irniger et al. | | 52/40 |
| 2009/0049782 A1 * | 2/2009 | Long, Sr. | | E04B 1/4171 52/506.05 |
| 2009/0307998 A1 * | 12/2009 | Zavitz et al. | | 52/152 |
| 2010/0212808 A1 * | 8/2010 | Horne | | 156/93 |
| 2010/0325986 A1 * | 12/2010 | Garc A Maestre et al. | | 52/223.3 |
| 2011/0113708 A1 * | 5/2011 | Skjaerbaek et al. | | 52/223.1 |
| 2011/0138704 A1 * | 6/2011 | Bagepalli et al. | | 52/147 |
| 2011/0223272 A1 * | 9/2011 | Stiesdal | | 425/63 |
| 2011/0239564 A1 * | 10/2011 | Zheng et al. | | 52/231 |
| 2011/0315691 A1 * | 12/2011 | Skovholt | | 220/560.12 |
| 2012/0036798 A1 * | 2/2012 | Holger | | 52/173.1 |
| 2012/0047840 A1 * | 3/2012 | Gregor | | 52/651.01 |
| 2012/0058299 A1 * | 3/2012 | Serwin | | 428/131 |
| 2012/0141295 A1 * | 6/2012 | Martinez De Castaneda et al. | | 416/244 R |
| 2012/0174522 A1 * | 7/2012 | Gregor | | 52/651.01 |

OTHER PUBLICATIONS

International Search Report from corresponding PCT/EP2012/003007, mailed Nov. 27, 2012.
International Preliminary Report on Patentability from corresponding PCT/EP2012/003007, mailed Jan. 30, 2014.

* cited by examiner

METHOD AND SLIDING FORM FOR PRODUCING A STRUCTURE AND CORRESPONDING STRUCTURE

RELATED APPLICATION

This application is the U.S. national phase of PCT/EP2012/003007, filed Jul. 17, 2012, which claims priority to DE 10 2011 107 804.9, filed Jul. 17, 2011.

TECHNICAL FIELD

The invention relates to a load-bearing structure and the method of producing it, in particular a tower structure, e.g. of a wind energy plant tower, comprising a hollow concrete part including an external wall which is made of concrete and surrounds a cavity. The invention further relates to a slip formwork for producing a structure.

BACKGROUND

Today, there is a constant need for wind energy plants (WEA) to become more and more powerful, and at the same time, more and more efficient. Due to the increased number of wind energy plants which have already been installed in coastal regions, wind energy plants are erected more and more frequently also in areas remote from the coast. In these areas, the wind energy plants have to have larger hub heights (distance from the rotor hub to the ground) for increasing the efficiency according to the upper wind gradient. For this reason, however, the demands on the WEA towers increase and, above all, the costs for producing them also increase. Further, an increasing hub height also implicates that the towers will have a significantly larger weight, as they have to reach the same stability and stiffness despite the head flange being situated at a higher level. This is why, in particular, WEA towers made of ferroconcrete have established themselves in the last years with increasing height, which are erected in a hybrid construction method. The term "hybrid construction method" means that the lower section of the tower is made of ferroconcrete onto which a steel tower is placed which, for its part, carries the nacelle.

SUMMARY

A load-bearing structure and the method of producing said structure, in particular of a wind energy plant tower, provides a hollow concrete part. The method allows the production of highly stressed components, in particular of large length, which exhibit an improved short-term strength and in particular an improved fatigue behavior. Further, a slip formwork for producing the structures is provided.

This is accomplished by producing a load-bearing component comprising a hollow concrete part including an external wall made of concrete surrounding a cavity. The external wall is produced by the following steps: producing an internal wall layer from bulk concrete, and producing an external wall layer from fine-grain concrete by embedding a textile reinforcement in the external wall layer, with the two wall layers forming a composite part.

Thus, the two layers of the composite part merge into each other and are not separate from each other, as is the case, e.g., during the renovating or partially reinforcing of structures whose cracked external wall or weakened supporting elements can be reinforced with what is called a textile concrete. According to prior art, a subsequent, additionally applied layer is provided between the old surface of the component and the new, textile-reinforced reinforcement layer. In the process of reinforcing ceilings for enhancing the bearing load in prior art, this is also carried out afterwards, in local fashion and according to the requirements which did not exist at the time of producing the ceiling. In principle, same applies to the already mentioned renovation in which the supporting behavior of the original component has decreased over the years. Above all, the aim of these measures is to increase the load bearing capacity. The same applies to any wrap-type reinforcements of supports and posts. The typical thinness of the walls of individually produced textile concrete components in turn has the effect that such components can only transfer relatively low compression forces in their slender cross-sections and their capability of absorbing large bending, torsion or shear force strains in the filigree, sheet-like or slightly curved components is insufficient.

The method according to the invention further provides for a larger slenderness in the cross-section of the component, an improved outer surface, an improved crack distribution, higher ductility, and an improved static and dynamic stiffness.

In terms of the object of the invention, the aims and the properties of the suggested composite part go much further and into a different direction than the prior art outlined herein in terms of renovation and new construction and the tasks to be fulfilled there. An example worth mentioning here is that the pure transfer of previous applications according to prior art fails to reach the desired goals, e.g., because in case of dynamically loaded structures such as WEA towers which are subject to heavy non-linear stress fluctuations and motions, it is to be feared that subsequently applied layers become detached at least in portions after a certain number of load changes; among other things, this will be avoided by the invention.

In the composite part produced according to the invention, the properties of the external and internal wall layers complement each other. The internal wall layer which is mainly under compressive stress is made of low-cost bulk concrete which may comprise commercial cement grades and additives with substantial grain size and, according to an embodiment, may contain conventional reinforcement steel. The fine-grain concrete which is much more expensive and has a higher proportion of cement paste and cost-intensive additives is only used for the thin external wall layer and, in the light of its dimensions, exclusively serves to completely embed the textile reinforcement. The production method according to the invention ensures the compound effect of the two layers which jointly provide the desired properties later on, in particular the improved fatigue behavior. Due to the textile reinforcement, the external wall layer can withstand an extremely high tensile force and compensates in this way the weakness of the bulk concrete. Compared with the thin fine-grain concrete, the bulk concrete due to its relative high thickness is resistant to bulging, creasing and buckling in case of load types such as bending, shear force, normal force, and torsion and keeps the thin fine-grain concrete layer in shape even if high force components are transferred. Due to the fact that there is an intimate, also chemical connection of the layers, the advantages and the features of the fine-grain concrete layer combine with those of the bulk concrete layer according to the invention in an advantageous way and result in an overall structure which has a much higher performance than each of the layers by itself.

Furthermore, the corrosion resistance of the textile does away with the passivation layer which would otherwise be required, and the overall construction may have a smaller thickness whereby the dead load of the entire wall layer and of the structure is significantly smaller. On the other hand, the thickness of the internal wall layer, depending on the dimensioning, can be reduced by the proportion of the bar steel reinforcement and concrete encasement and overlap which would otherwise be required for the tensile force, which is taken over by the textile. The same applies to the elimination of the reinforcement owing to the textile concrete.

The compound created all over the surface area results in the inner layer being subjected to far less tensile stress, and the fatigue behavior of the entire structure is significantly improved as—compared to conventional reinforcement steel in bulk concrete—the more ductile textile in the fine-grain concrete absorbs in particular a substantial amount of the occurring tensile loads which especially in the case of wind energy plant towers have a dynamic and non-linear character. The internal bulk concrete absorbs according to its capabilities in particular the occurring compressive forces.

The textile reinforcement improves the short-term strength, and the structure can be designed in such a manner that the admissible level of the service load increases correspondingly with only minor additional effort (a larger amount of the textile reinforcement) due to the addition of the stretching rigidities of the reinforcements, resulting in the cross-section having a still higher reserve in terms of cracking. Depending on the dimensioning, the composite part may indeed change from a state I (uncracked) to the state II (cracked) with all those extreme load situations which are possible over the operating time. But due to the fine-mesh textile reinforcement and the concomitant crack formation which has a finer distribution by factor 10 and also an opening degree which is narrower by factor 10, there will be no pronounced, deep formation of cracks at all as far as into the inner, compressively stressed layer which is prone to corrosion due to the reinforcement steel. Rather, the occurring cracks are so fine that they get closed immediately, a corrosion of steel reinforcements in deeper layers is prevented, and a carbonization of the concrete does not occur.

Due to the finely dispersed force control of the tensile forces in the fine-meshed reinforcement just below the surface, the entire component behaves, due to the common action of the two layers, far more ductile than a comparable component which is only realized in ferroconcrete or only in textile concrete. The compound action of the two layers creates the rigidity which is in particular desired in constructing WEA towers, which is due to the more economic use, and the use of the building materials employed in their respective layers which is appropriate in each case for the involved materials. This is of importance especially with wind energy plant towers which are subject to a multi-axial loading, because the towers of wind energy plants have to withstand up to one billion load changes over their operational life span (high-cycle-fatigue). There is hardly any structure which has to withstand these dimensions of load changes, which is why WEA towers represent an own, above all a separate category of structures, which can also not be compared with bridge structures which are subject to load changes in numbers which are less by some orders of magnitude, although with longer service life. It is exactly this demand which is optimally met by the compound action of the two layers and the improved fatigue behavior achieved thereby.

During its service life, the ferroconcrete tower section of wind energy plants sustains different, more intense loadings than is the case with other components in other structures; above all, these loadings occur in a shorter period of time. In particular the problematic nature of non-linear distortion and damage developments during the fatigue process and the basic material properties as well as their effects on the usability and the resulting required sizing of the component play a highly essential role here. Up to now, the fatigue processes experienced by (ferro) concrete components with inconstant stress variance and inconstant load amplitude are counteracted by way of the properties of this material and its standards defined in the regulations according to its capabilities with an appropriate dimensioning of the components. In wind energy plant towers, the pulsating tensile load is kept as small as possible by an excessive compression, and almost the entire analysis of the strain-related variation range (which is not negligible for wind energy plants) is carried out in the range of the pulsating compression load. However, it is only the fatigue endurance limit of the concrete which is of importance, as wind energy plants sustaining more than one billion load changes exceed the finite life fatigue strength of the concrete (which is specified with one million load changes) by several orders of magnitude.

The bulk concrete used is in particular a concrete with aggregates exhibiting grain sizes of more than 4 mm, preferably up to at most 32 mm.

The producing of the composite part may preferably be performed in that the one of the two wall layers which has been produced first and is still wet outside and already has a certain stability in its green state will be directly covered with the other wall layer for the formation of an intimate, chemical compound. Thus, the external wall is produced by using a wet-on-wet construction method. The invention teaches to produce both layers, i.e. the internal wall layer which is mainly subject to compressive stress and the external wall layer which is subject to tensile loads, substantially at the same time, especially by the wet-on-wet method. This method results in a permanent, low-stress substance-to-substance connection between the two layers over the full surface area, reliably ensuring in particular the required improved fatigue behavior with respect to a one-layered wall construction despite the presence of two layers, because any shrinkage cracks on the interface between the two layers in the process of common hydration are prevented.

In the event of wind energy plants, the concrete will change after some time at least to state II due to the extreme loads, which means that it has external cracks and that there are only the steel reinforcements and pretensioning elements which can take the occurring tensile loads. Owing to the invention, the improved short-term strength of the external wall layer normally allows the inner concrete cross-section to completely stay in state I, i.e. it remains in a state without any cracks. In this way, there are no deep cracks which could propagate over time as far as into the reinforcement and would cause the corrosion of the steel reinforcement and the carbonization of the concrete.

The textile reinforcement is in particular a so-called textile mat, preferably also a three-dimensional mat with several superimposed and spaced 2D mats. A mat is a textile sheet structure and is comprised of several layers of biaxial or multi-axial fiber rovings which are arranged in parallel.

The textile reinforcement should be implemented as a so-called "grid," i.e. a sort of resin-impregnated cross structure of fiber rovings which is provided with openings. The fine-grain concrete passes through these openings, so that it contacts the inner side and outer side of the textile reinforcement or, in other words, so that the textile reinforcement is completely embedded in the fine-grain concrete (fiber matrix composite).

On its outer side, the hollow concrete part should be completely surrounded by the textile fabric transverse to its main direction of extension or main direction of loading, so that the internal wall layer is relieved from tensile stress as far as possible when the main load is applied.

The hollow concrete part has preferably an elongated shape and it is preferred that it is completely surrounded by the external wall layer, preferably also completely surrounded by the textile mat, along at least a partial length in a circumferential direction. With regard to a tower, this means the following: To give an example, it is possible that a lower or an upper section of the tower (or the entire tower, of course) is completely surrounded by the external wall layer and also by the textile fabric in the circumferential direction. Further, there may also be portions in which the textile fabric and/or the external wall layer is not provided for dimensioning reasons, in order to save costs.

If the hollow concrete part is elongated, the textile fabric can preferably be laid in webs. The direction of laying the webs may be carried out in a longitudinal direction, in a transverse direction, by spirally winding and/or so as to extend in a cross-wise fashion. It is preferred that the edges of neighboring web portions overlap in order to prevent, on the one hand, the generation of crack starting points and so as to guarantee, on the other hand, the continuous tensile force load-carrying effect with a frictional connection by the overlapping portions.

For further stabilizing, it is possible as an option to have extensions of the textile reinforcement which extend towards the inside as seen in cross-section. With this measure, the reinforcement can extend close to the outer skin of the hollow concrete part but comprise droppers towards inside which cause a further stabilization. In this connection, these extensions may also extend until the radial inner side of the external wall, and in particular also serve as a shear reinforcement. Thus, circular segments are created between the rib-like extensions, which are made of bulk concrete. If applicable, the hollow concrete part may comprise a layer of fine-grain concrete also on the inner side, into which a textile reinforcement is embedded.

As an alternative or in addition to completely sheathing the external wall layer by the textile reinforcement, the latter may extend in an elongated hollow concrete part in the form of textile reinforcement webs which run in the longitudinal direction and are spaced from each other, so that there will be strip-like gaps without a textile reinforcement.

The external wall is preferably produced by a construction method which uses a slip formwork. This construction method is very cost-efficient, as it allows to produce large structures within short time. Further, this production process ensures that the large hollow concrete part, which has a length or height of some dozen meters, in case of towers preferably more than 90 m, preferably more than 130 m, is manufactured as a monolithic body, in which the layers are manufactured and connected from the beginning to the end in wet-on-wet technology and in continuous fashion, similar to an extrusion process. With the sliding method according to the invention, either a conically tapering tower or a cylindrical tower is produced.

In case of a WEA, it is preferred that the entire concrete section of the tower, starting above the foundation, is produced as a monolithic body.

The preferred embodiment makes provision that the internal wall layer is produced first and subsequently the external wall layer is applied onto the internal wall layer. The internal wall layer is not hard-dry at all; rather, the concrete is still at the beginning of its setting process which means that it already has a certain stability in its green state.

In the process of producing the renovation layers in textile concrete which have been discussed above, the additional layer of textile concrete is applied onto the prepared subfloor in several manual and expensive work steps, by first applying a fine-grain concrete layer on the subfloor which has been roughened by sandblasting and has been wetted; the textile is pressed into this fine-grain concrete layer and subsequently spackled or spray-coated with further fine-grain concrete. This procedure will be repeated until a sufficient number of grid layers have been applied according to the dimensioning. In the next step, the cross-section is provided with a usually very thin covering and, at the surface, with the desired finishing. This is a very labor-intensive method.

The process of producing pure textile components is usually performed in several work steps which are carried out by hand: First, the formwork is lined with a first layer of fine-grain concrete into which so many layers of textile reinforcement (alternating with fine-grain concrete) are introduced until the desired cross-section of the component is achieved.

The production method according to the invention which is suggested by the invention for constructing the described composite part, is a further development of a sliding method according to the preferred embodiment. Sliding methods are known as continuous production methods for concrete elements. Structures made of ferroconcrete are produced with slip formworks in a continuous building process, consisting of producing cut-outs, openings and installing mounting parts, reinforcing and placing the concrete. The process of sliding the formwork body is performed with climbing rods on which the entire formwork construction pulls itself up. The force brought into action by hydraulics is converted by lifting cylinders. The formwork face is dimensioned such that the concrete which sets during the sliding process has a sufficient strength at the lower end upon leaving the formwork. The crucial advantages of the slip formwork as compared to climbing formwork systems are the quick progress of the construction works, an anchor-less, homogeneous and uniform surface of the concrete without any joints, cavities and air voids, and the economic integration of concrete and reinforcement, in the event of erecting high structures in particular also the insensibility to wind and weather.

The further development according to the invention for creating the cross-sections of the invention in a continuous manufacturing process and hence in a process which is appropriate for both the involved materials and the process steps preferably makes provision to use a conventional, preferably linear and cylindrical slip formwork as a leading formwork, in which a bulk (ferro)concrete profile is made wet-on-wet in horizontal layering and produces a monolithic jointless component. According to the invention, the bulk concrete employed is adjusted in terms of its properties such that it leaves the lower end of the leading formwork in a state where it has a certain stability in its green state and with a surface roughness as produced, allowing an intimate chemical bond with the following, second concrete layer, in this case the first fine-grain concrete layer, which is applied by spraying preferably in automated manner. The first (or single) layer of a 2D or 3D textile reinforcement is applied onto this first fine-grain concrete layer, and subsequently further layers of fine-grain concrete and mats are applied until the desired cross-section is achieved.

Subsequently, the fine-grain concrete is smoothed by a trailing gantry which is suspended, for instance, on a leading gantry and is kept in its accurate position during the trailing process via guide rolls, for example.

Depending on the different grades of concrete, the bulk concrete is preferably vibrated by a cylinder compactor. The fine-grain concrete can be compacted via a high-frequency compactor with a compaction energy which is adapted to the fine-grain concrete and, on the one hand, does not interfere with the setting process of the hardening crystalline structure of the bulk concrete in deeper layers and ensures, on the other hand, that the fine-grain concrete flows around the textile reinforcement and encloses it as completely as possible. This ensures the desired reliable compound between the mat and the concrete matrix.

The geometry of the trailing formwork and the compacting energy introduced therein allows to achieve, in contrast to conventional techniques of spraying concrete, a substantially lower proportion of air voids in the fine-grain concrete profile and hence an improved adhesion bond between the textile reinforcement and the concrete. In addition, the conical and funnel-shaped upper edge of the trailing formwork collects any fine-grain concrete which may fall down due to a possible rebound, avoiding loss of material during applying the fine-grain concrete. When it leaves the suggested trailing formwork, the surface of the fine-grain concrete owing to the high-frequency compaction does not exhibit any pores, cavities or similar flaws, but represents a very smooth and hence weather-resistant finishing.

After having manufactured the two concrete profiles, the bulk concrete and the fine-grain concrete harden simultaneously. The simultaneous and continuous production, according to the invention, of mutually penetrating profiles allows a setting and hardening process with smallest possible shrinkage strains and hence provides for the desired fatigue-resistant load-bearing performance of the overall profile.

Provided that the bulk concrete is realized in the preferred sliding method with reinforcement steel, the manufacturing of the internal wall layer is carried out according to the usual methods of inserting reinforcement steel into a concrete profile. The textile reinforcement, however, is laid preferably and selectively in longitudinal or transverse direction, in cross-wise or diagonal fashion, and is unreeled, e.g., from reels which are inserted in dedicated devices on the slip formwork and bring about the correct position and the tightening of the textile reinforcement during installation.

An alternative embodiment to the one mentioned above makes provision that the same concrete is used for both layers. In doing so, a bulk concrete is used which has a relatively high amount of flow improvers, preferably a high amount of mikrosilica. In the course of the production process and during the sliding process, the concretes demixes in a controlled manner in the area where the textile reinforcement is introduced. This is why the finer additives and the cement slurry of the bulk concrete flow towards outside through the textile reinforcement, which acts like a kind of grid or a filter, so that the concrete composition differs as seen in cross-section. The result in the area of the textile reinforcement is a kind of fine-grain concrete, merging into the coarser bulk concrete. Here too, the bulk concrete and the fine-grain concrete form an intimate package, as in this case they are even made from one and the same concrete.

The above-mentioned alternative embodiment may also be improved as follows: A grid-like supporting structure (similar to a vertical grating) on the slip formwork supports the textile reinforcement during the introduction of the concrete by the supporting structure protruding into the annular gap between the inner and outer formworks. As soon as concrete is being introduced, the textile reinforcement exerts a pressure against the supporting structure. The grid-like supporting structure controls the segregation of the concrete and allows only the finer components to pass and flow around the textile reinforcement. This alternative makes provision that the bulk concrete is conditioned with appropriate flow improvers, so that it completely encloses the textile reinforcement as is the case in the variant with a fine-grain concrete specifically adapted thereto and the desired adhesion bond is ensured by the addition of the flow improver and possibly other additives which improve the adhesion bond with the textile reinforcement.

This alternative sliding process exclusively with bulk concrete makes provision that the concrete compactors always work whenever the supporting structure separating between the coarse and the fine concrete is pulled out, in order to close any cavities which have been left behind. Further, it is avoided that the concrete sticks to an excessively coarse surface on the supporting structure, as the concrete slides down only due to its own weight.

Both sliding methods, i.e. the one with two different concrete grades and the one with a demixing concrete grade, can be carried out according to the invention in such a manner that the formwork gantries are completely encased and air-conditioned. It is possible in this way to create conditions similar to those of a production of prefabricated parts in a hall. This further allows to guard against the prejudice of the experts in terms of the sensitivity to weather and the changing production conditions of sliding methods due to fact that the ambient temperatures are rarely ideal. Thus, the invention provides a plant for prefabricated components on minimum space.

Both sliding methods make provisions for a handling of the employed building materials which is appropriate for the involved materials. The two sliding methods ensure a reliable substance-to-substance, full-area bond between the two concrete layers. Due to the simultaneous setting process of the two layers, there are fewer internal stresses in the composite part, in particular in the area where the layers are connected to each other. The intimate connection of the two layers forms the basis to achieve the wanted compound action in the component as from the very first moment. Despite of a high load input, the resistance to fatigue and the correct function of the compound is guaranteed throughout the desired useful life without any delamination and shear phenomena. The low level of mechanical stress created by the production process according to the invention during the common hydration of the two layers on macroscopic as well as on microscopic level is the production-related prerequisition for a smaller level of shrinkage cracks in the cement mortar matrix of both layers and at the boundary layer between the two layers. Any micro-cracks will show a significantly slower growth throughout the period of use, giving the concrete the desired resistance to fatigue. This applies in particular to WEA towers with their characteristic, highly dynamic and nonlinear stresses.

The internal wall layer should preferably be made of ferroconcrete. This allows the internal wall layer to accept components of the tensile, bending and/or torsional stresses in addition to the compressive force.

Moreover, a superficial reinforcement as prescribed is to be provided, preferably on the surface areas without any textile reinforcement.

Regardless of the use of ferroconcrete for the internal wall layer, it is to be underlined that the outer textile-reinforced wall layer is realized without any steel reinforcement.

Further, the component is pretensioned according to the preferred embodiment after its production by using tendons. These tendons extend in the external wall and/or in the cavity itself. Thus, the structure according to the invention is additionally pretensioned, so that the external wall exhibits a high level of inner compression. This additional measure allows to produce towers having an enormous overall height and at the same time a marked slenderness. The combination of the three elements bulk concrete, textile concrete, and tendons additionally increases the economic efficiency, in particular with components which are subject to high bending stresses, such as towers of wind energy plants, due to the optimal distribution of the occurring flows of force to these three components. As the hollow concrete part is able to take up further tensile forces already in the textile concrete layer, the number of the tendons which are still required can be correspondingly reduced compared with a conventional hollow concrete part if all other conditions are the same.

The textile reinforcement (mat/grid/sheet) may be made of glass fibers, basalt fibers, or aramid or of carbon fibers, or a mixture of these fibers, for instance in a biaxial or multiaxial 2D or 3D mat, or the reinforcement may be a combination of different mat types. The textile reinforcement made of carbon fiber represents the preferred embodiment.

Furthermore, the textile reinforcement is installed preferably in a slightly stretched state, i.e. the soft textile is not slack during applying and embedding it in the concrete, but is somewhat taut. This is to prevent the generation of any bulges which later on would result in inhomogeneities in the flux of force.

As already explained, the structure produced according to the invention is in particular a section of a wind energy plant tower, with the structure having a height of at least 90 m, preferably of at least 130 m.

The structure can be produced in a hybrid construction method, i.e. the lower part is a hollow concrete part produced according to the invention, and a steel tower is fitted thereon.

The hollow concrete part, as a wind energy plant tower or a section of said tower, can optionally comprise the textile reinforcement only in the lower section where the moments of force are particularly high, in the area of junction points of members, or only in the upper section, whereby the top load can be kept at a lower level due to the larger possible slenderness of the tower. This is particularly advantageous, because the load on the tower top is particularly high due to the heavy nacelle which is aligned with the wind and due to the thrust applied by the rotor; this is why especially very high towers are prone to "tipping."

Although the method according to the invention is preferably carried out for towers of wind energy plants, it may also be used with advantage for other large, in particular elongated structures having a length of preferably at least 50 m, for instance for chimneys, cooling towers, shafts of television towers, the fundamental structure of high-rise buildings, silos, bunkers, wells, or foundation structures, in particular of offshore facilities, bridge pylons, hollow boxes of bridges and the like.

Due to the higher obtainable rigidity of the structure and possibly also due to the smaller top load, the wind energy plant tower does not deflect that much, allowing for a more stable position of the nacelle and hence for an improved operation of the plant, as the oscillations of the tower do not propagate as far as into the rotor blades, additionally adding to the oscillations of the rotor blades.

The method according to the invention uses two different grades of concrete with two different types of reinforcement (when using ferroconcrete) in different geometrical dimensions and with different material properties, which significantly improves the vibration damping of the components, and which is of great importance and very advantageous for WEA towers.

Due to the jointless fine-grain concrete, the outer skin is very smooth, strong and very weather-proof.

The grades of concrete are preferably matched with each other such that both wall areas have the same degree of shrinkage and shrinkage cracks in the boundary area of the two layers are avoided which is important for the resistance to fatigue.

According to the invention, the fine-grain concrete may be included in the group "UHPC" (ultra-high performance concrete).

In summary, it is to be emphasized with respect to the method according to the invention:

Owing to the fact that both wall layers are made in simultaneous production, the method according to the invention reduces the shrinkage cracks (which naturally occur during hydration) to a minimum, whereby there is also no accumulation of cracks in the transition area of the two layers. According to the invention, this is achieved by the simultaneous or approximately simultaneous setting of the layers with mutually adapted shrinkage values in the setting process, the so-called wet-on-wet technology. This manner of production is the prerequisite that the advantageous properties of the textile concrete and those of the bulk (ferro) concrete complement each other to result in a dimensionable composite part in which the composite effect can develop in such a manner that the properties of each individual wall layer can have full influence on the compound performance, and this performance is maintained throughout the entire useful life even with progressing fatigue.

The invention further relates to a slip formwork for producing a hollow concrete part of a load-bearing structure, in particular of a wind energy plant tower. This slip formwork is used in particular for carrying out the method according to the invention. The slip formwork comprises a leading inner formwork and a leading outer formwork which constitute the annular space for producing a wall layer of bulk concrete between them. A formwork trailing in the sliding direction and associated to the inner and/or outer formwork, i.e. is arranged downstream the inner and/or outer formwork, is provided for smoothing the external wall layer applied onto the internal wall layer. This is why the trailing formwork is slightly spaced radially from the associated leading formwork, in fact by the thickness of the external wall layer.

The slip formwork of the invention allows a quick production of the hollow body, in fact with a constantly high quality.

The leading formwork and the trailing formwork should be mechanically coupled to each other, so that the distance between the formworks always remains constant and only one drive system (usually a lifting cylinder) is required.

An automatic integration of the textile reinforcement in the fine-grain concrete may be provided in that the slip formwork itself is provided with a reel mounting for receiving at least one reel of the textile reinforcement.

Preferably, the reel mounting is equipped with a brake exerting a certain rolling resistance on the reel. This introduces the reel, and hence the textile reinforcement, to be always slightly taut.

Especially if the reinforcement is to surround the structure entirely, several reel mountings should be provided to be distributed around the circumference of the annularly extending slip formwork. The overall web width of all the reels which are received in the reel mountings is in particularly larger than the circumference of the component to be produced.

A guideway present near the trailing formwork provides for deflecting the textile reinforcement, if (in the state coming from the reel) it is to be pressed preferably against the internal wall layer.

The trailing formwork may have realized its inlet side as a funnel, i.e. it may expand like a funnel, so that small lumps of the fine-grain concrete which fall down are supplied into the formwork and again attached to the component.

The individual formwork parts, which have the shape of a ring segment, are firmly coupled to each other or can be laterally moved with respect to each other and complement each other to form a continuously surrounding formwork ring. If the formwork parts can be laterally shifted with respect to each other, it is possible to produce conical structures in automated fashion. With stationary segments, a cylindrical component is produced.

Finally, the invention also relates to a load-bearing structure, in particular a wind energy plant tower comprising a hollow concrete part with an outer wall of concrete surrounding a cavity. This hollow concrete part comprises an internal wall layer made of bulk concrete and an external wall layer made of fine-grain concrete in which the textile reinforcement is embedded. The two wall layers constitute a composite part by the wall layers being connected by a substance-to-substance bond. It is preferred that the load-bearing structure is pretensioned through tendons.

The above-mentioned features with respect to the method can also be applied to the structure according to the invention. This relates to the kind and orientation of the textile reinforcement, the reinforcement of the ferroconcrete, the tendons and the like.

BRIEF DESCRIPTION OF THE DRAWINGS

Further features and advantages of the invention will be apparent from the following description and the following drawings to which reference is made and in which.

DETAILED DESCRIPTION

Figure 1:
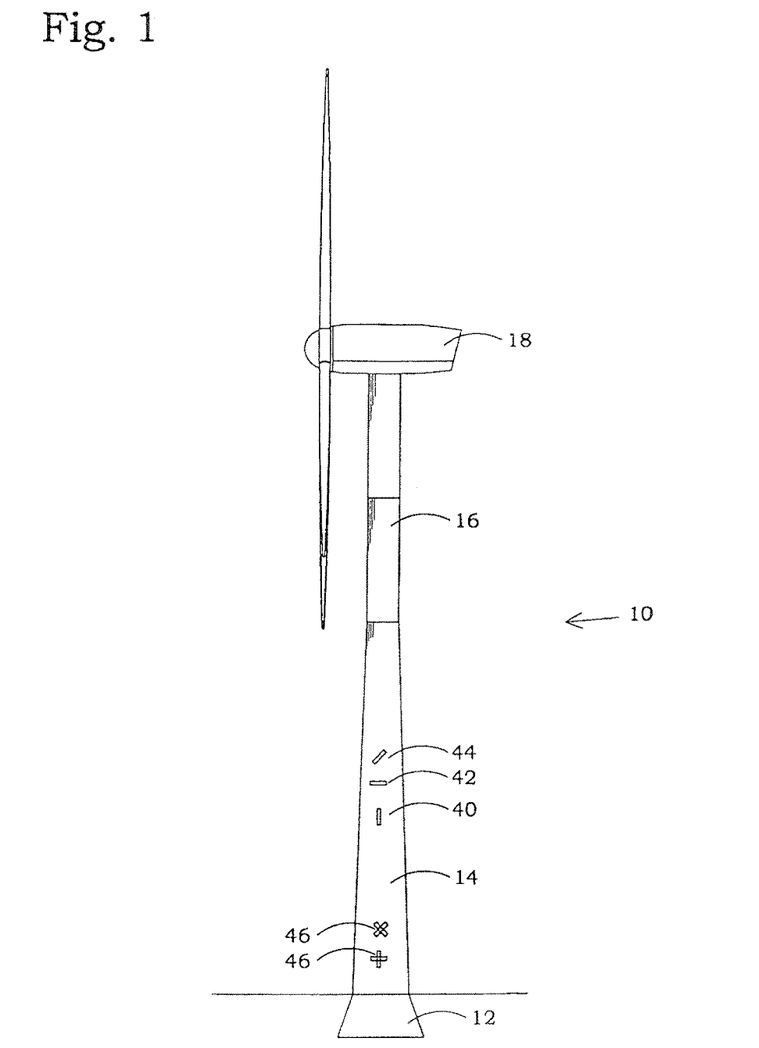
FIG. 1 is a view of a wind energy plant comprising a wind energy plant tower produced according to the invention.

FIG. 1 illustrates a load-bearing structure in the form of a wind energy plant tower 10, realized here as a hybrid tower, which is not to be understood as a limiting factor for the structure, however. In the case of the wind energy plant which is illustrated here, the structure has a hollow concrete part 14 based on a foundation 12 and having a height of at least 90 m, in particular of at least 130 m. Placed on the hollow concrete part 14 is a steel tower 16 carrying the nacelle 18.

The hollow concrete part 14 can be produced as a monolithic body or be composed of several individual parts which are put one onto the other and, if need be, may be connected to each other. In this case, the hollow concrete parts have a minimum length of preferably 10 m and are elongated bodies.

Figures 2A, 2B, 4A, 4B:
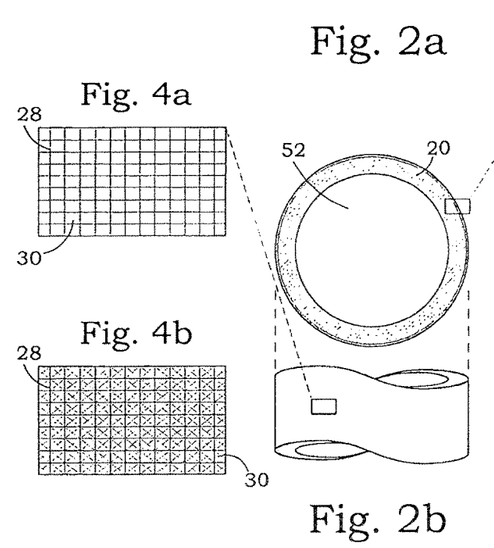
FIG. 2a shows a cross-section through the structure of the invention according to FIG. 1.
FIG. 2b is a side view of the structure according to FIG. 1, FIGS. 3a to 3d are enlarged sectional views through several variants of the structure produced according to the invention in the area according to FIG. 2a defined by a rectangle.
FIGS. 4a to 4d are views of various textile reinforcements used in the invention.

FIG. 2a shows a cross-section of the hollow concrete part 14 which is realized as a tube, preferably as a linear and cylindrical tube.

The hollow concrete part 14 is constituted by an outer wall 20 delimiting the cavity 52 in the interior of the structure. The outer wall 20 is assembled of several wall layers which constitute a composite part.

The internal wall layer 22 (see FIGS. 3a to 3d) is made of bulk concrete. The term "bulk concrete" means that this concrete is very cheap and comprises gravel with a grain size of more than 4 mm, up to usually 32 mm. The aggregate is specified according to European Standard EN 12620.

It is preferred that this internal wall layer 22 is ferroconcrete which implies that a steel reinforcement 24 is contained therein. The steel reinforcement 24 is only shown in FIG. 3a, but as an option it may be used in all of the embodiments and variants of the invention.

Figure 3A:
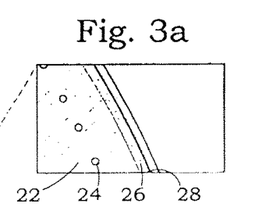

An external wall layer 26 is applied onto the full surface area of the outer side, here the radial outer side of the internal wall layer 22; said external wall layer consists of fine-grain concrete and a textile reinforcement 28 embedded in the fine-grain concrete.

Fine-grain concrete has maximum grain sizes of preferably smaller than 1 mm.

The thickness of the external wall layer amounts preferably to between 10 and 50 mm which is not to be understood in a limiting sense. Normally, this is approximately at most 20%, preferably at most 10% of the thickness of the internal wall layer 22 which is subjected to compressive stress.

As can be seen in FIGS. 3a to 3d, the textile reinforcement 28 is completely embedded in the fine-grain concrete and does not protrude towards outside and is also not visible from outside.

FIG. 4a shows a top view of such a textile reinforcement 28. This textile reinforcement is preferably a textile mat, more specifically a bidirectional or multidirectional grid, also referred to as a 3-D fabric.

The reinforcement consists of glass fibers, preferably of carbon fibers.

Figure 4C:
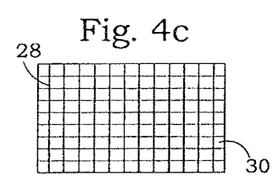
Figure 4D:
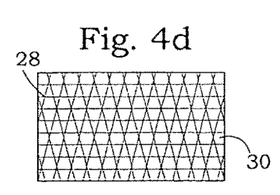

FIGS. 4a to 4d illustrate various possible embodiments of the textile reinforcement 28 having different filament orientations. Whereas FIGS. 4a and 4c show a purely grid-shaped orientation comprising partly multiple longitudinal filaments (FIG. 4c) (bidirectional), FIGS. 4b and 4d disclose in addition or alternatively filaments with diagonal orientation (multidirectional). These designs provide for an increased ability to withstand stress in longitudinal direction and an increased torsional stiffness.

In any case, the textile reinforcement 28 is designed such that there are openings 30 between the filaments, which are so large that the fine-grain concrete is able to pass through these openings 30 and no air pockets are created. Further, the size of the openings 30 is larger than the maximum grain size present in the fine-grain concrete, preferably larger by the factor 6 to 8. The size the openings is determined here by the shortest diagonal line crossing the center of area of the opening.

In the embodiment according to FIG. 3a, there is only one layer of the textile reinforcement or there are several superimposed layers contacting each other.

Figure 3B:
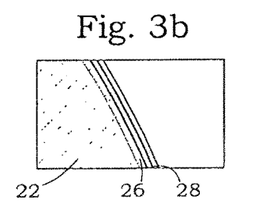

In the embodiment according to FIG. 3b, there are several individual layers provided as textile reinforcements 28, which are radially spaced from each other but are each completely embedded in the external wall layer 26.

Figure 3C:
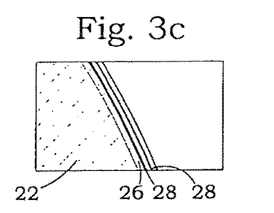

In the embodiment according to FIG. 3c, there are also several textile reinforcements 28 which are spaced from each other; as an example, the radially inner textile reinforcement is of another nature here than the outer textile reinforcement 28.

Figure 3D:
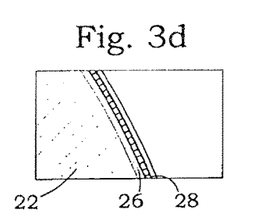

The embodiment according to FIG. 3d shows a reinforcement 28 which is realized as a 3D grid, with a preliminarily set, defined spacing, in the illustrated case two mutually spaced mats which are connected through distance-keeping elements, usually yarns.

Figure 14:
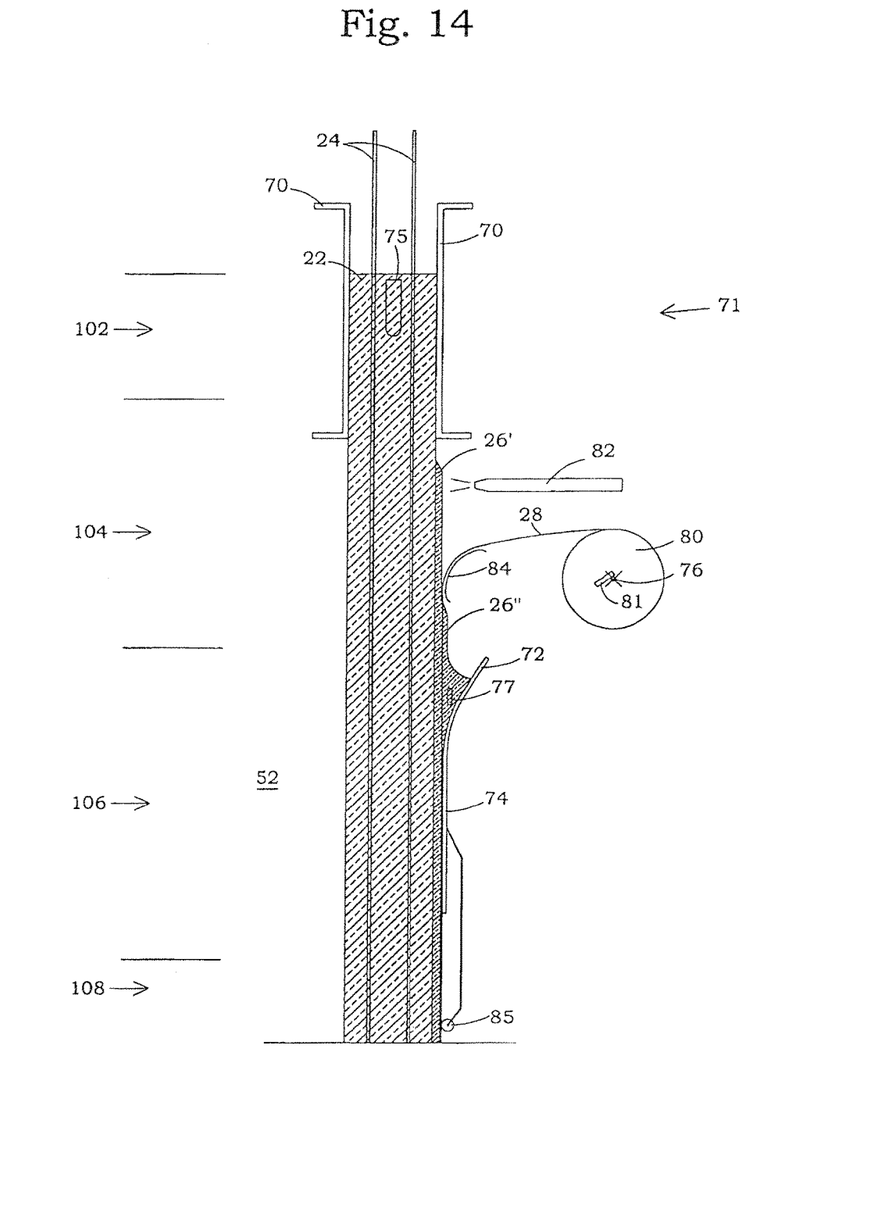
FIG. 14 is a longitudinal sectional view through the slip formwork according to the invention with the textile reinforcement being unreeled in longitudinal direction during carrying out the method according to the invention.

The production of the hollow concrete part 14 will be explained below on the basis of FIG. 14; this production method, however, relates to all embodiments.

First, the internal wall layer 22 is made from bulk concrete, by providing corresponding inside and outside formworks 70 into which the bulk concrete 22 is poured in the liquid state and is vibrated, e.g., with a cylinder compactor 75 with elevated compacting energy.

The formworks 70 are part of the entire slip formwork 71, so that the whole hollow concrete part is realized as a monolithic body for the total height of the tower's concrete portion having a height of preferably at least 90 m, preferably of at least 130 m. Whereas the concrete comes out of the slip formwork in the area 104 with a certain stability in its green state and sets (hydration) in lower layers (see layer 106) and finally solidifies, see area 108, it is poured in at the upper end of the formwork in area 102 in the liquid state.

The external wall layer 26 is applied like a plaster preferably in spray gun technology (see spraying machine 82), more specifically in that period when the internal wall layer 22 is still wet and has just set to such an extent that it is able to support its own weight and keep its shape (i.e. has a certain stability in its green state).

Depending on the direction of processing the textile reinforcement, it is possible to apply a thin layer of fine-grain concrete 26' onto the internal wall layer 22 first. Subsequently, the textile reinforcement 28 is unreeled preferably from a reel 80.

Several reel mountings 76 which carry the reels 80 are provided on the slip formwork 71 and are distributed along the circumference.

A brake 81 for the reel 80 ensures that the reinforcement 28 can be unreeled and applied in a slightly taut manner. The procedure can be repeated so many times until a sufficient number of layers of the reinforcement 28 is applied. In the end, a further thin layer of fine-grain concrete 26" is applied, so that the textile reinforcement 28 cannot be seen from outside.

In doing so, preferably a further, trailing slip formwork 74 may be present on the radial outer side of the structure, which compacts and smoothes the fine-grain concrete 26, 26', 26" by using a funnel 72, a high-frequency compactor 77 with low penetration depth, and a trailing end portion 74.

The reinforcement 28 can be aligned, e.g., in the longitudinal direction (here sliding direction) through at least one adjustable guideway 84 which is preferably fastened to the slip formwork 71.

Supporting rollers 85 provided on the slip formwork 71 roll on the outer side of the external wall which has already set to a further extent and constitute a radial support for the slip formwork 71.

Figure 15:
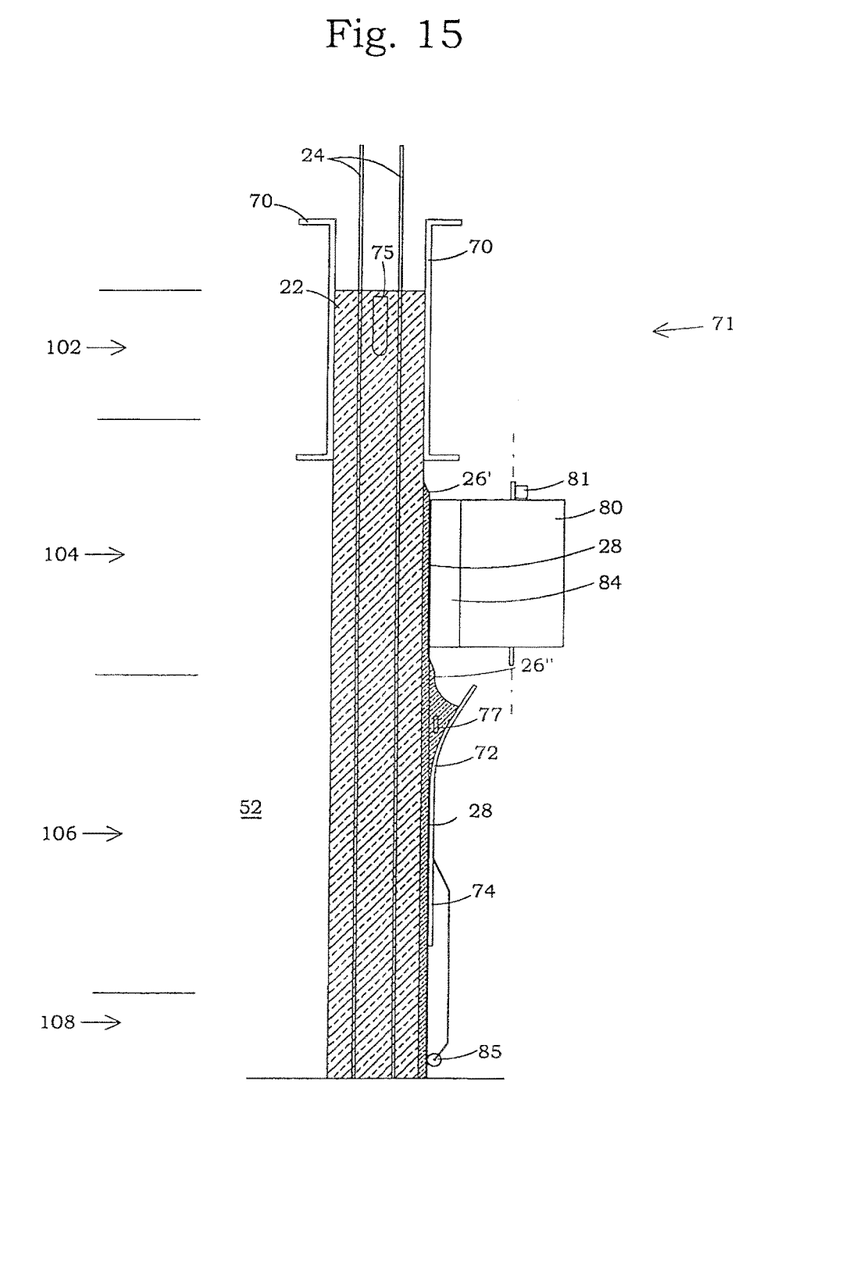
FIG. 15 is a longitudinal sectional view through the slip formwork according to the invention with the textile reinforcement being unreeled in transverse direction.

In FIG. 15, the reel 80 is arranged to stand in vertical position. The reinforcement 28, being unreeled transverse to the sliding direction, is directed to the fine-grain concrete 26' via the guideway 86. Any other unreeling operations such as diagonal or cross-wise or combined ones are also possible.

The formworks 70 and the trailing formwork 74 comprising the guideway 84 as well as the corresponding reel mountings are mechanically connected to one another for the formation of the slip formwork 71. Where appropriate, the compactors 75, 77 may already be part of the slip formwork 71.

It is not necessary that the high-frequency compactor 77 projects into the fine-grain concrete 26; instead, it would also be possible that only the trailing slip formwork 74 is made to oscillate at high frequency.

Due to producing the layers in wet-on-wet fashion, the layers 22, 26 set at the same time, and there occurs a substance-to-substance bond across the entire surface area on the outer side of the internal wall layer 22, so that there is no risk of the external wall layer 26 being torn off when under stress.

According to the preferred embodiment, the hollow concrete part 14 has its outer side completely surrounded by the external wall layer 26 in the circumferential direction, i.e. transverse to the main direction of stress which is caused in the present case by the load acting on the rotor (bending).

In the embodiments which are shown here, the textile reinforcement 28 also extends completely around the outer side of the hollow concrete part.

If the textile reinforcement 28 is produced and delivered in the form of webs, there are various ways how to apply the reinforcement. On the one hand, it is possible that laterally overlapping longitudinal webs extend along the entire length of the hollow body (see longitudinal web 40 in FIG. 1).

As an alternative or in addition, it is also possible to wrap a web 42 in transverse direction at least once around the circumference of the internal wall layer 22. As a further alternative or in addition, webs 44 may also be wrapped in spiral shape. These options can be combined as desired.

Preferably and in a non-limiting sense, neighboring web portions overlap each other at their edges in overlapping sections.

A further possibility is to overlap the webs 46 in cross-shaped manner (see FIG. 1), by wrapping them each in opposite directions and in spiral fashion.

Prior to installation, the textile reinforcement 28 should be provided externally with an adhesion layer and/or should be impregnated.

Figure 5:
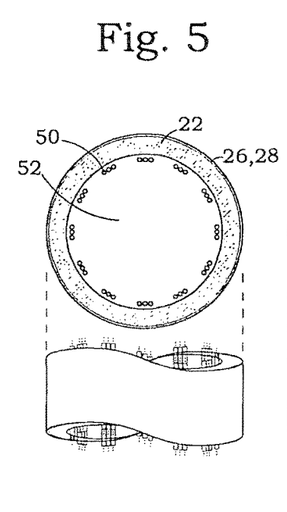
FIGS. 5 to 8 are cross-sectional views and corresponding longitudinal sectional views through the structure of the invention produced by the method according to the invention according to different variants.

Especially with elongated, highly stressed bodies such as, e.g., wind energy plant towers, it is of advantage if the structure is pretensioned, too. This can be seen in FIGS. 5 to 7. Tendons 50 extend in the cavity 52, spaced from the inner side of the internal wall layer 22 (see FIG. 5), or the tendons 50 are housed within the internal wall layer 22, i.e. they extend preferably in channels in the wall layer 22 which have been introduced beforehand. The channels, however, do not extend to the external wall layer 26.

Figure 6:
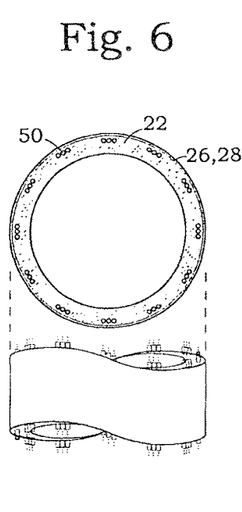

The external wall layer 26 is free from any steel reinforcement, as is shown in FIG. 6.

Figure 7:
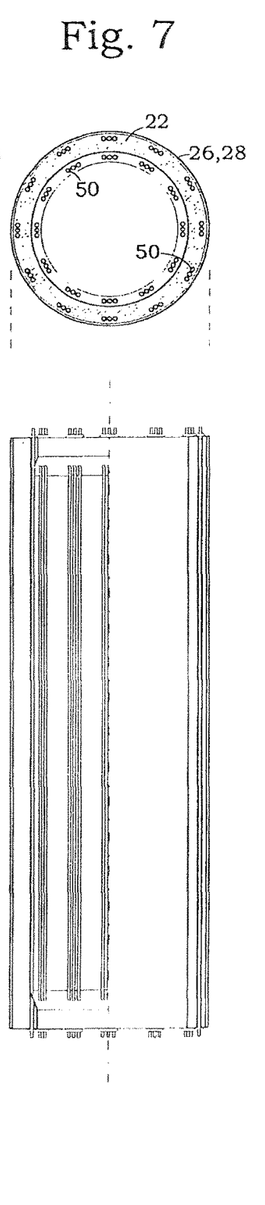

It goes without saying that it may be advantageous to provide the tendons 50 in the cavity as well as in the internal wall layer 22, as illustrated in FIG. 7.

The tendons should extend along the entire length of the hollow concrete part, with respect to FIG. 1 at least from the lower end of the steel tower 16 or from an intermediate flange between the steel tower 16 and the hollow concrete part 14 as far as into in the foundation 12.

Due to the tendons 50, the external wall is pretensioned so that in a loading condition the tensile strain can be efficiently distributed among all elements capable of absorbing tensile stress and so that the tensile strain reaching the outer skin of the external wall is as small as possible.

Figure 8:
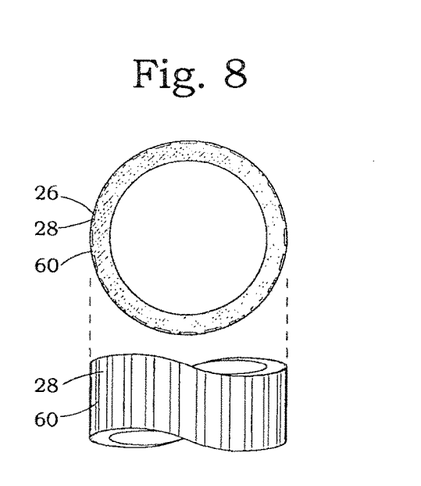

In the embodiment according to FIG. 8, the webs of the textile reinforcement 28 are embedded in the outer layer 26 so as to extend in the longitudinal direction, with the webs being laterally spaced from each other, so that portions 60 are created in circumferential direction between neighboring webs which are realized without any textile reinforcement 28. The fine-grain concrete may be provided in these portions 60, which is not to be understood in a limiting sense, in order to create a uniform external texture of the component.

Figure 9:
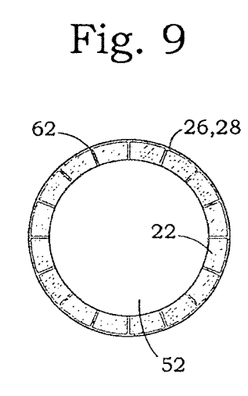
FIGS. 9 to 11 show further cross-sections of variants of the structure of the invention produced according to the invention.
Figure 10:
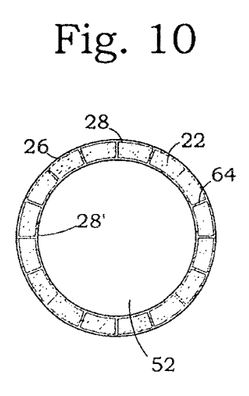
Figure 11:
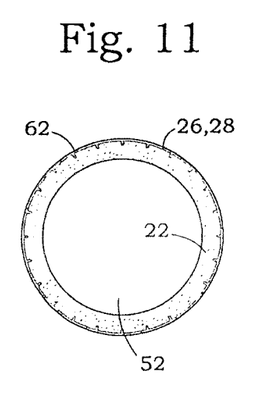

In the embodiments according to FIGS. 9 to 10, rib-like extensions 62 made of a textile reinforcement extend from the textile reinforcement 28 (which has an annular cross-section) and protrude radially inside, projecting into the outer layer 26 to a greater or lesser extent (see FIG. 11). Where appropriate, the extensions 62 may also extend as far as into the internal wall layer 22, as is illustrated in FIG. 9. Here, the extensions even extend completely through the internal wall layer 22.

In the embodiment according to FIG. 10, there even occurs a kind of hollow box construction for the textile reinforcement 28, which indeed is embedded externally in the external wall layer 26, but extends right through the internal wall layer 22 up to the radial inner side of the outer wall 20, where an annular, textile reinforcement 28 or reinforcement layer 28' is present which is closed as seen in cross-section. In this embodiment, the size of the openings in the textile reinforcement 28 in the area of the radial bridges 64 should be larger than the grain size of the bulk concrete 22, preferably significantly larger.

Figure 12:
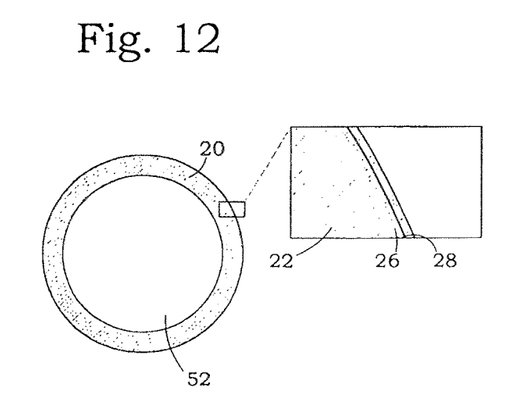
FIG. 12 is a cross-sectional view through a structure of the invention produced by a further method according to the invention.
Figure 16:
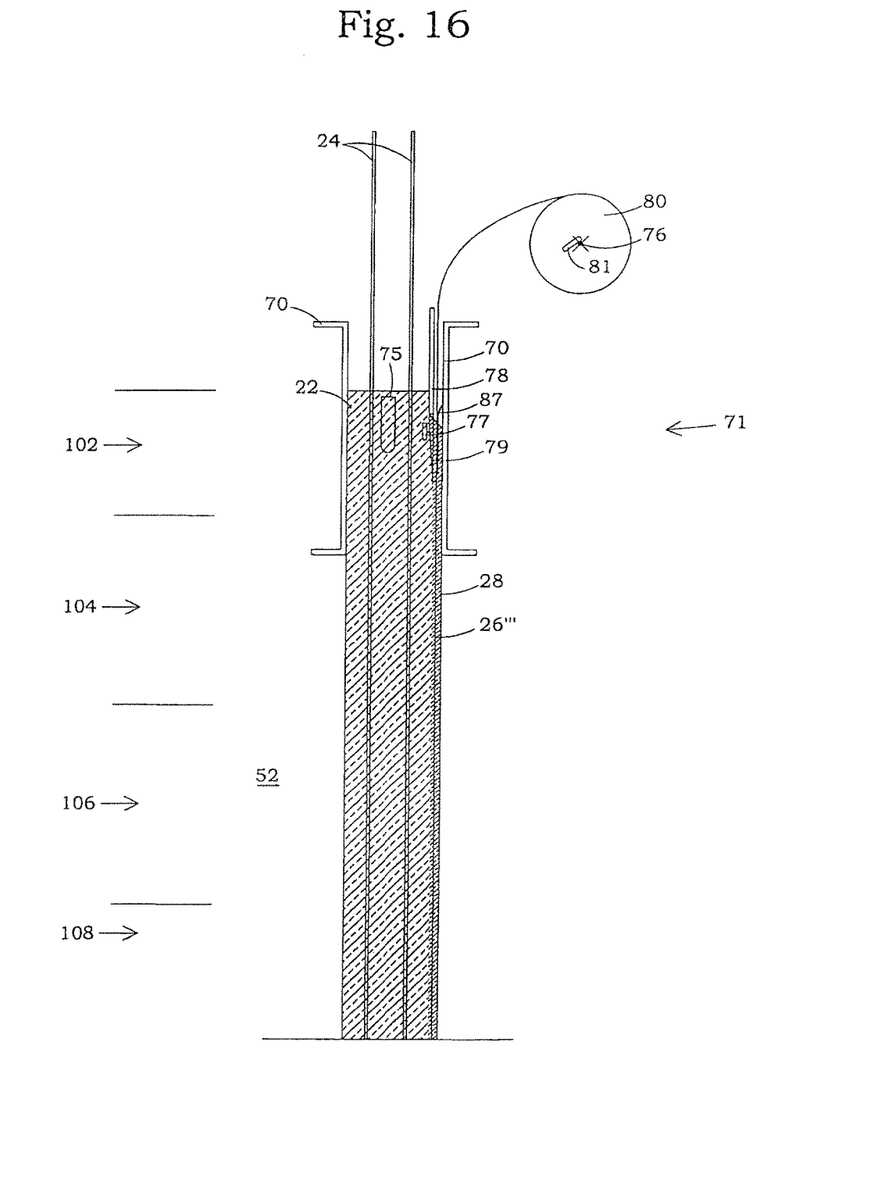
FIG. 16 is a longitudinal sectional view through the slip formwork of the invention according to a further embodiment.

FIGS. 12 and 16 show a variant of the method described so far. Here, the textile reinforcement 28 between the formworks 70 is initially held with some distance to the inner side of the outer formwork 70 by using a supporting structure 87 which is fastened to the formwork 70 and projects into the gap between the formworks 70. Subsequently, the bulk concrete 22 is poured in between the reinforcement 28 and the inner formwork. The bulk concrete 22 has a grain size distribution which is adapted to the openings in the textile reinforcement 28 such that small grains and the cement paste can pass through the openings of the reinforcement 28, whereas larger grains are held back inside by a radially inside grid 79 fastened to a support 78. The grid 79 is also fastened to the formwork 70. Thus, distinct layers occur, namely an inner layer with large grain size which is defined by the bulk concrete in its basic structure, and an outer layer 26''' which is structured like a fine-grain concrete but, so to speak, is created by some kind of sifting out and by a controlled segregation of the bulk concrete. The layers 22, 26''' merge into each other and are produced in wet-on-wet fashion.

Figure 13:
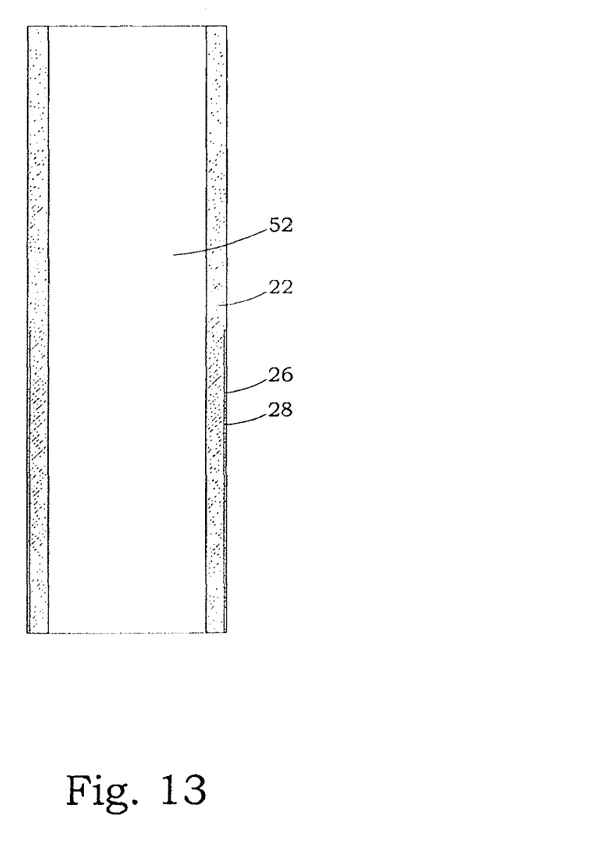
FIG. 13 is a longitudinal sectional view through the structure of the invention produced according to the invention according to a variant.

FIG. 13 shows a variant in which the textile reinforcement 28 and/or the entire external wall layer 26 extend(s) only over a partial length of the hollow body in order to save costs. With regard to a tower, this may be the lower section of the concrete tower, for example; however, this is not to be understood in a limiting sense.

The advantage of manufacturing the composite part is that its production is appropriate for the involved materials and processes. The advantages of the produced composite part itself are represented by an interaction of the different material properties of textile concrete and bulk concrete. The created properties of the composite component correspond substantially to the properties which are desired in erecting the tower of a wind energy plant: high resistance to fatigue, good damping of vibrations, low excitation, slenderness, material efficiency and the capability of absorbing and relieving stresses in multi-axial fashion, and the recyclability of the building materials. The simultaneous production process by using a continuous sliding procedure allows in both illustrated cases a powerful composite part with a small spread of the median Wöhler curve and hence an improved confidence interval of the produced component.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of producing a tower structure, the tower structure including a hollow concrete part comprising an outer wall of concrete surrounding a cavity, the outer wall being produced by the following steps:
   producing an internal wall layer from bulk concrete, and subsequently,
   applying an external, outer wall layer of fine-grain concrete, which is different from the bulk concrete, onto an outer side of the internal wall layer to form a composite part by using a slip formwork and embedding a textile reinforcement in the external, outer wall layer, and
   wherein the fine-grain concrete has a higher proportion of cement paste than the bulk concrete; and
   wherein while the internal wall layer is solidifying and an outer surface of the internal wall layer is still wet, the external outer wall layer is applied as follows:
      applying a first layer of the fine-grain concrete directly onto the outer surface of the internal wall layer,
      subsequently applying at least one layer of the textile reinforcement directly on the first layer, and subsequently applying a second layer of the fine-grain concrete directly onto the textile reinforcement such that the textile reinforcement is completely embedded within the external outer wall layer.

2. The method according to claim 1, wherein the external, outer wall layer is directly applied onto the outer side of the internal wall layer, when the outer side is still wet, to form a composite.

3. The method according to claim 1, wherein the textile reinforcement is a textile mat.

4. The method according to claim 1, wherein an outer side of the hollow concrete part is completely surrounded by the external, outer wall layer.

5. The method according to claim 4, wherein, as seen in cross-section, the textile reinforcement, which has a circular cross-section and surrounds the internal wall layer, is provided with inwardly extending extensions.

6. The method according to claim 1, wherein the hollow concrete part has an elongated shape and is surrounded by the external, outer wall layer over at least an axial partial length in a circumferential direction.

7. The method according to claim 1, wherein the hollow concrete part is elongated and wherein the textile reinforcement comprises textile reinforcement mats with webs being laid in at least one of the following manners: laid in a longitudinal direction, laid in a transverse direction, laid by spirally winding, and laid to extend in a cross-wise fashion.

8. The method according to claim 1, wherein the hollow concrete part is elongated and neighboring webs of the textile reinforcement extend in a longitudinal direction and are spaced from each other in a circumferential direction.

9. The method according to claim 1, wherein the internal wall layer is produced from ferroconcrete.

10. The method according to claim 1, wherein the hollow concrete part is a section of a wind energy plant tower.

11. The method according to claim 1, wherein the slip formwork comprises a die structure that contacts the bulk concrete to form the internal wall layer.

12. A method of producing a tower structure, the tower structure including a hollow concrete part comprising an outer wall of concrete surrounding a cavity, the outer wall being produced by the following steps:
producing an internal wall layer from a first type of concrete, and subsequently;
applying an external, outer wall layer of a second type of concrete, which is different from the first type of concrete, onto an outer side of the internal wall layer to form a composite part by using a slip formwork and embedding a textile reinforcement in the external, outer wall layer; and
wherein while the internal wall layer is solidifying and an outer surface of the internal wall layer is still wet, the external outer wall layer is applied as follows:
applying a first layer of the second type of concrete directly onto the outer surface of the internal wall layer,
subsequently applying at least one layer of the textile reinforcement directly on the first layer, and
subsequently applying a second layer of the second type of concrete directly onto the textile reinforcement such that the textile reinforcement is completely embedded within the external outer wall layer.

13. The method according to claim 12, wherein the second type of concrete has a higher proportion of cement paste than the first type of concrete.

14. The method according to claim 12, wherein the external, outer wall layer is directly applied onto the outer side of the internal wall layer, when the outer side is still wet, to form a composite.

15. The method according to claim 12, wherein the textile reinforcement is a textile mat that is completely embedded within the second type of concrete.

16. The method according to claim 12, wherein an outer side of the hollow concrete part is completely surrounded by the external, outer wall layer.

17. The method according to claim 12, wherein the hollow concrete part has an elongated shape and is surrounded by the external, outer wall layer over at least an axial partial length in a circumferential direction.

18. The method according to claim 12, wherein the hollow concrete part is elongated and wherein the textile reinforcement comprises textile reinforcement mats with webs being laid in at least one of the following manners: laid in a longitudinal direction, laid in a transverse direction, laid by spirally winding, and laid to extend in a cross-wise fashion.

19. The method according to claim 12, wherein the first type of concrete includes a gravel having a grain size that is 4 mm or greater, and wherein the second type of concrete has a maximum grain size that is less than 1 mm.

20. The method according to claim 19, wherein the first type of concrete comprises a ferroconcrete with an internal steel reinforcement, and wherein the textile reinforcement is completely embedded within the external, outer wall layer.

21. The method according to claim 19, wherein the hollow concrete part is a section of a wind energy plant tower.

22. The method according to claim 12, wherein the slip formwork comprises a die structure that contacts the first type of concrete to form the internal wall layer.

* * * * *

UNITED STATES PATENT AND TRADEMARK OFFICE
CERTIFICATE OF CORRECTION

PATENT NO. : 9,657,722 B2  
APPLICATION NO. : 14/232623  
DATED : May 23, 2017  
INVENTOR(S) : Philipp Wagner Page 1 of 1

It is certified that error appears in the above-identified patent and that said Letters Patent is hereby corrected as shown below:

On the Title Page

In item (73), Assignee, Line 2; replace "Munich" with --Muenchen--

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*